(12) United States Patent
Shaffer

(10) Patent No.: US 6,186,443 B1
(45) Date of Patent: Feb. 13, 2001

(54) AIRBORNE VEHICLE HAVING DEPLOYABLE WING AND CONTROL SURFACE

(75) Inventor: James E. Shaffer, Maitland, FL (US)

(73) Assignee: International Dynamics Corporation, Apopka, FL (US)

( * ) Notice: Under 35 U.S.C. 154(b), the term of this patent shall be extended for 0 days.

(21) Appl. No.: 09/344,032

(22) Filed: Jun. 25, 1999

Related U.S. Application Data

(60) Provisional application No. 60/090,732, filed on Jun. 25, 1998.

(51) Int. Cl.[7] .................................................... B64C 3/56
(52) U.S. Cl. ............................................. 244/49; 244/3.29
(58) Field of Search ................................ 244/3.24, 3.26, 244/3.3, 49, 75 R

(56) References Cited

U.S. PATENT DOCUMENTS

| | | | |
|---|---|---|---|
| 2,538,602 | * 1/1951 | Taylor et al. | 244/49 |
| 2,876,677 | * 3/1959 | Clark et al. | 244/49 |
| 4,165,847 | 8/1979 | Detalle . | |
| 4,635,881 | 1/1987 | Brieseck et al. . | |
| 4,659,037 | 4/1987 | Unterstein . | |
| 4,664,338 | 5/1987 | Steuer et al. . | |
| 4,699,334 | 10/1987 | Boeder . | |
| 4,709,877 | * 12/1987 | Goulding | 244/49 |
| 4,869,442 | 9/1989 | Miller . | |
| 4,923,143 | 5/1990 | Steuer et al. . | |
| 5,039,030 | 8/1991 | Kraus . | |
| 5,042,749 | * 8/1991 | Jacques et al. | 244/49 |
| 5,108,051 | 4/1992 | Montet et al. . | |
| 5,582,364 | 12/1996 | Trulin et al. . | |
| 5,615,846 | 4/1997 | Shmoldas et al. . | |
| 5,671,899 | 9/1997 | Nicholas et al. . | |

* cited by examiner

Primary Examiner—Galen L. Barefoot
(74) Attorney, Agent, or Firm—Holland & Knight LLP; David G. Maire

(57) ABSTRACT

An airborne vehicle having a deployable airfoil with an elevon wherein the deployment of the airfoil and the control of the elevon are both powered by a single servo mechanism. A shear pin prevents relative movement between the elevon and the airfoil until the airfoil is in the deployed position. A stop mechanism locks the airfoil in the deployed position, whereafter operation of the drive mechanism fractures the shear pin, thereby allowing the elevon to be controlled by the drive mechanism.

18 Claims, 2 Drawing Sheets

AIRBORNE VEHICLE HAVING DEPLOYABLE WING AND CONTROL SURFACE

This application claims benefit to U.S. Provisional 60/090,732 filed Jun. 25, 1998.

BACKGROUND OF THE INVENTION

This invention relates generally to the field of airborne vehicles having deployable wings or fins, and more particularly to a vehicle having a deployable wing with a control surface, and specifically to an airborne vehicle having both a deployable wing and a control surface that are operated by a single drive mechanism.

It is known that the performance of an airborne vehicle, such as a missile, artillery shell or other projectile can be improved by the use of one or more fins or wings deployed along the longitudinal axis of the airborne vehicle. Such fins are used to improve the stability of the vehicle during its flight as well as to provide a steering mechanism to improve the targeting accuracy of the vehicle. In many instances it is necessary to store the fins within the body of the vehicle before deployment. The conventional method for doing so is to pivot the fin at one end and to deploy it radially outward after the vehicle is launched. The energy to deploy such a fin may be supplied by a motor or solenoid, a spring, a pressurized fluid or gas cylinder, or the aerodynamic force of the air passing over the vehicle during its flight. Drive mechanisms for such applications are often expensive to design and to manufacture because they are required to survive severe acceleration loads during the launching of the vehicle.

Certain designs for airborne vehicles require the use of both a lifting airfoil as well as a control surface associated with the airfoil. The mechanism used to deploy such an airfoil/control surface assembly and to control the assembly once it is deployed can be expensive, heavy and large, thereby limiting the size of airborne vehicle upon which it may be utilized. It is known, for instance, to utilize one motor for the deployment of a fin or wing, and a second motor for control of that fin or wing or a control surface associated therewith. The use of redundant motors adds to the expense, weight and size of such a design.

U.S. Pat. No. 5,108,051 issued on Apr. 28, 1992 to Montet et al. teaches a mechanism for deployment and control of an airborne vehicle fin that utilizes a single motor. A single actuator is utilized to rotate a fin from a first position in line with the axis of flight of the airborne vehicle to a second position perpendicular to the direction of flight. The aerodynamic forces acting on the fin are then utilized to cause the fin to pivot about a second axis so that it becomes aligned with the axis of rotation of the actuator. Thereafter operation of the actuator will perform a steering function by causing the deployed fin to pivot about its first axis. This system provides the advantage of utilizing only one actuator, however, it is limited in its application due to its reliance on the use of aerodynamic forces, as well as being limited by providing actuating forces along only a single axis. What is needed is a deployment mechanism for an airborne vehicle that can provide deployment and control forces along a plurality of axes without the need for a plurality of actuators.

Therefore, it is an object of this invention to provide an airborne vehicle having a deployable wing and an associated control surface that can be deployed and controlled by a single drive mechanism. It is a further object of this invention to provide an airborne vehicle having an airfoil which can be deployed from a storage to an extended position and can thereafter be controlled as a control surface by a simple, light, and relatively inexpensive deployment and control mechanism.

SUMMARY OF THE INVENTION

These and other objects of the invention are satisfied by An airborne vehicle having: a frame; a drive mechanism connected to the frame; a first drive link connected to the drive mechanism; a second drive link connected to the first drive link; a base; a control surface connected to the second drive link and to the base; a means for preventing relative movement between the first and the second drive links so that forward movement of the first drive link will move the base from a storage position to an extended position relative to the frame; a stop operable when engaged to prevent movement of the base relative to the frame once the base reaches the extended position; wherein operation of the drive mechanism with the stop engaged will release the means for preventing relative movement between the first and the second drive links so that movement of the drive mechanism will cause movement of the control surface relative to the frame.

BRIEF DESCRIPTION OF THE DRAWINGS

The aforementioned objects and advantages of the present invention will be more fully understood as a result of a detailed description of the invention when taken in conjunction with the following drawings in which.

DETAILED DESCRIPTION OF THE INVENTION

Figure 1:
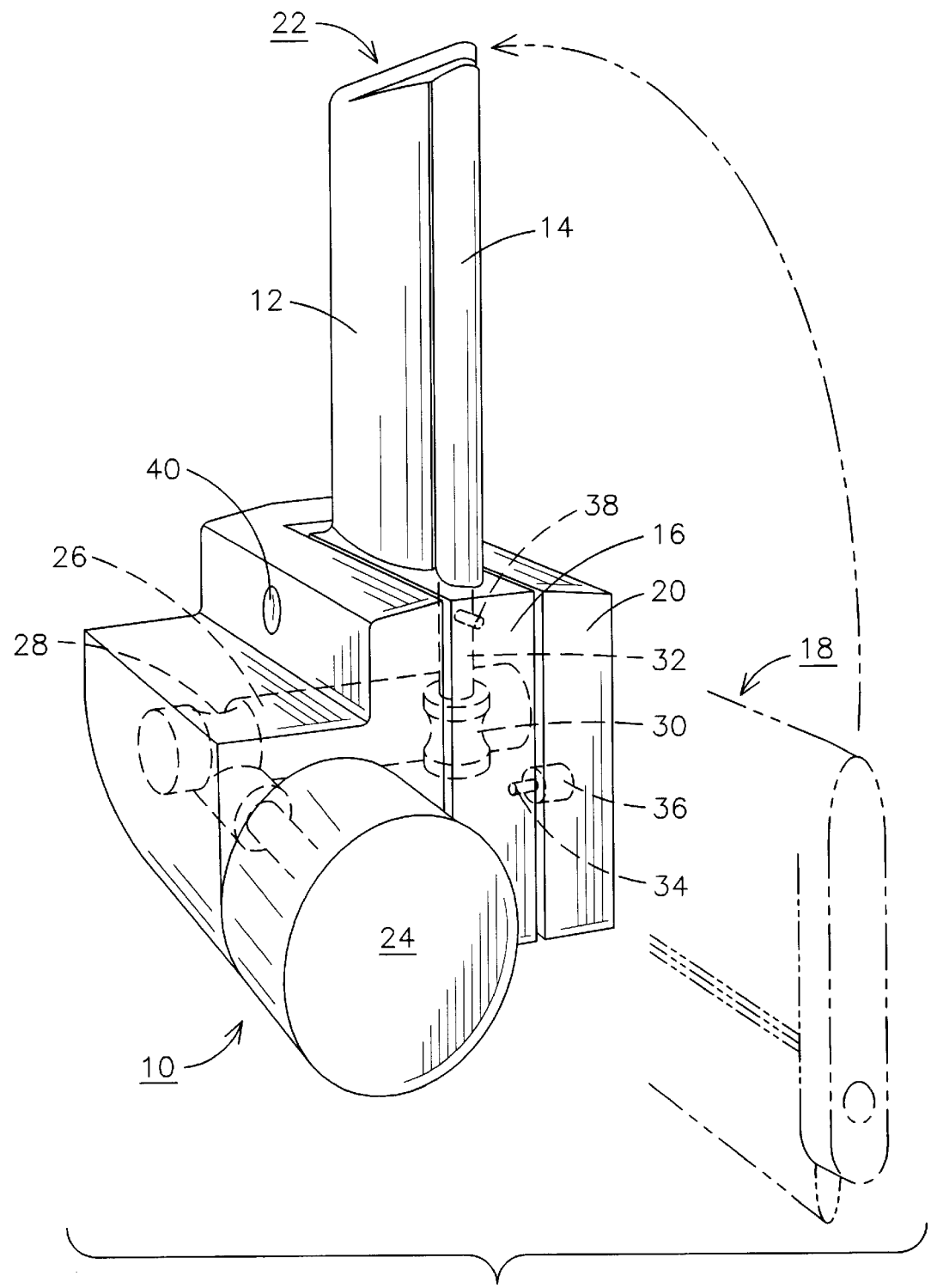
FIG. 1 is a perspective view of a portion of an airborne vehicle having a deployment and control mechanism for a wing and an elevon in accordance with the present invention.

FIG. 1 illustrates a portion of an airborne vehicle 10 having a deployable airfoil 12 associated with an elevon 14. The airfoil 12 is formed as an extension of a wing base 16. The wing base 16, airfoil 12, and elevon 14 may be deployed from a stowed position 18 within the outermost envelope of an airframe 20, to an extended position 22 perpendicular to the line of flight of airborne vehicle 10. Attached to and mounted within airframe 20 is a drive mechanism 24. The drive mechanism 24 may be a servo motor, solenoid, or other form of actuator known in the art. In the embodiment of FIG. 1, drive mechanism 24 is illustrated as a servo motor operable to provide rotational movement to a first drive link 26. First drive link 26 is illustrated as being a drive shaft having a spiral gear assembly 28, 30, on both ends. Spiral gear assembly 30 connects the first drive link 26 with a second drive link 32. Second drive link 32 is illustrated as a drive shaft connected to elevon 14. In the embodiment illustrated in FIG. 1, airfoil 12 provides lift for extending the useful range of airborne vehicle 10. Elevon 14 provides a control surface for guiding the airborne vehicle more precisely toward its target and developing the lifting contour in combination with the airfoil 12.

Prior to the launch of airborne vehicle 10, the airfoil 12, elevon 14 and airframe 20 are in stowed position 18. In order to limit the vibrational movement of the assembly during the highly stressful launching event, a sheer pin 34 may be provided as a means for preventing relative movement between the wing base 16 and the airframe 20. A similar means (not shown) may be provided for preventing relative movement between the airfoil 12 and/or elevon 14 and the airframe 20 during the launch of the airborne vehicle 10. Subsequent to the launch, sheer pin 34 may be withdrawn by an actuator 36. Alternatively, shear pin 34 may be designed to fracture and to fail upon the operation of drive mechanism 24. Once the airborne vehicle 10 is in flight, drive mechanism 24 is energized to provide rotational movement of drive shaft 26. A sheer pin 38 or other means for preventing relative movement between the first drive shaft 26 and the second drive shaft 32 may be provided. Other embodiments of a means for preventing relative movement between the first drive shaft 26 and the second drive shaft 32 may include a clutch mechanism, a ball detent mechanism, and an actuator. Because the second drive shaft 32 is prevented from rotating relative to the first drive shaft 26, the forward rotation of the drive shaft 26 will result in the movement of the wing base 16, airfoil 12, and elevon 14 from the storage position 18 to the extended position 22 relative to the airframe 20.

Once the wing base 16 reaches the fully extended position 22, it is held in that position by a stop mechanism 40. The stop mechanism 40 is operable, when engaged, to prevent the movement of the wing base 16 relative to the airframe 20. The stop mechanism may be an actuator or it may be a spring loaded pin and detent mechanism. Once the stop mechanism 40 is engaged, continued operation of the drive mechanism 24 will serve to fracture sheer pin 38 or otherwise release the means for preventing relative movement between the first drive shaft 26 and the second drive shaft 32. Once sheer pin 38 has been fractured, rotation of first drive shaft 26 will cause rotation of second drive shaft 32, thereby causing rotation of the elevon 14 relative to the wing base 16. In this manner, both the deployment of the wing base 16 and the control of the elevon 14 are provided by a single drive mechanism 24.

Figure 2:
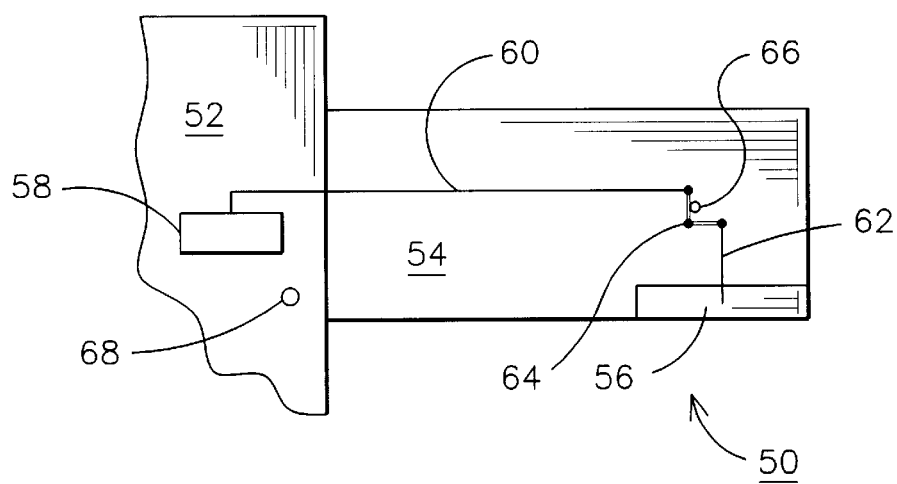
FIG. 2 illustrates a wing and control surface for an airborne vehicle utilizing a linear drive having a single motor in accordance with the current invention.

FIG. 2 illustrates in an embodiment of this invention utilizing a linear actuation system. An airborne vehicle 50 includes an airframe 52, a wing 54, and an aileron 56. The wing 54 is illustrated in an extended position and can also be withdrawn to at least a partially retracted position within frame 52. A single drive mechanism 58 connected to frame 52 is utilized both for extending the wing 54 from the withdrawn to the extended positions and for control of aileron 56. A first drive link 60 is connected to a second drive link 62 by a bellcrank 64. Sheer pin 66 is utilized to prevent he movement of bellerank 66 relative to wing 54, thereby preventing relative movement between first link 60 and second link 62. When sheer pin 66 is engaged, the forward operation of drive mechanism 58 will function to move wing 54 from its withdrawn to its extended position. Once the wing 54 is fully extended, a mechanical stop 68 will engage to lock the wing in its extended position. Mechanical stop 68 may be, for example, a spring loaded pin mounted in frame 52 which engages a hole (not shown) in wing 54 at the fully extended position. Once the mechanical stop 68 is engaged, further forward operation of drive mechanism 58 will fracture sheer pin 66, thereby allowing the operation of drive mechanism 58 to control the position of the aileron 56 in relation to the wing 54. In this manner, FIG. 2 illustrates the use of a single linear actuator 58 for the dual purposes of extending a wing 54 and controlling an aileron 56 in an airborne vehicle 50.

Figure 3:
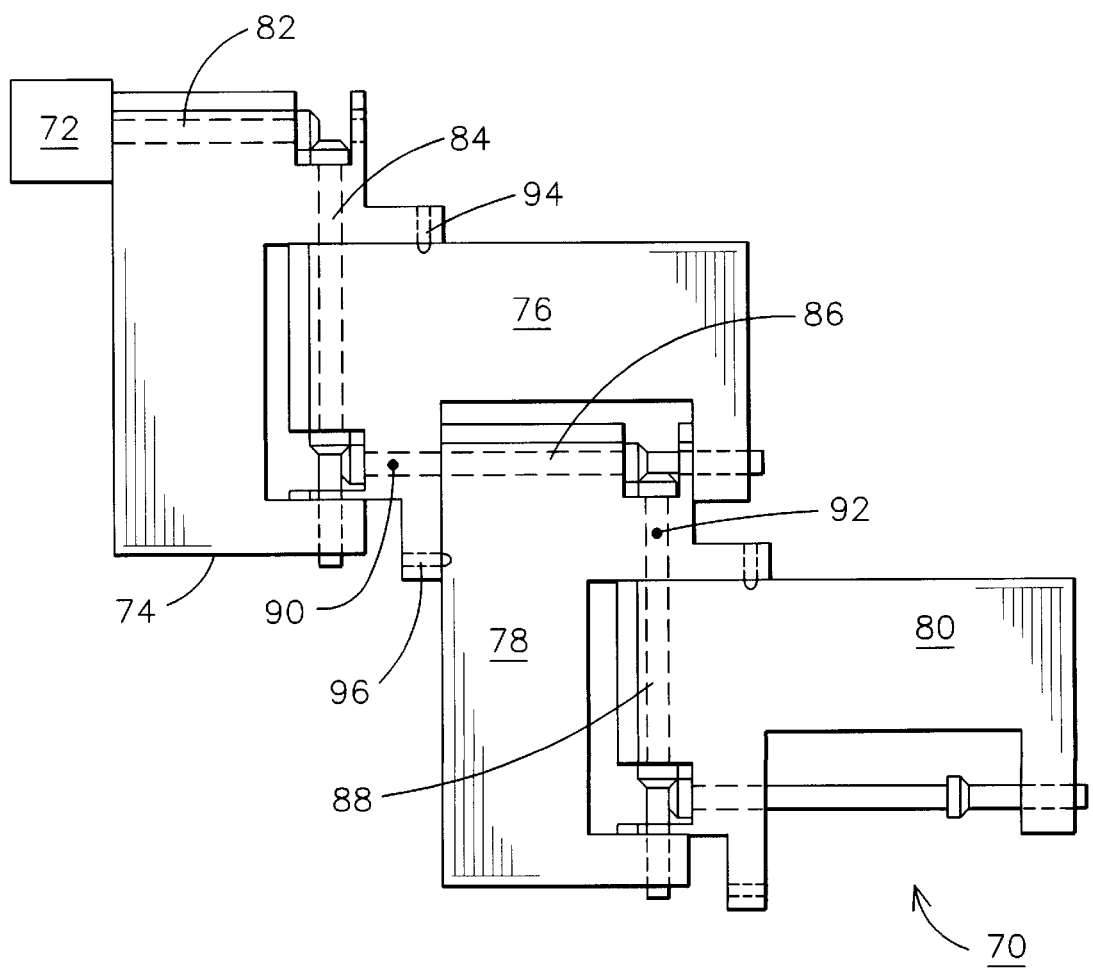
FIG. 3 is a perspective view of a mechanism for a airborne vehicle having three sequential articulation stages in accordance with the present invention.

FIG. 3 illustrates a portion of an airborne vehicle 70 having multiple articulated stages being deployed by a single actuator. A rotary drive mechanism 72 connected to a portion of an airframe 74 is utilized to drive a first stage 76, a second stage 78, and a third stage 80. Drive mechanism 72 operates through a geared drive shaft 82 to provide rotary motion to first drive link 84, second drive link 86, and third drive link 88. Sheer pin 90 is operable to prevent the relative motion of first drive link 84 and second drive link 86. Similarly sheer pin 92 is operable to prevent relative motion between second drive link 86 and third drive link 88. When both sheer pins 90, 92 are engaged, operation of drive mechanism 72 will serve to rotate an assembly consisting of first stage 76, second stage 78, and third stage 80 about the axis of first drive link 84. A ball detent mechanism 94 will engage to act as a mechanical stop when first stage 76 reaches a predetermined position. Continued operation of drive mechanism 72 with ball detent mechanism 94 engaged will serve to fracture sheer pin 90, thereby allowing second drive link 86 to rotate in response to the rotation of first drive link 84. In this second mode of operation, an assembly consisting of second stage 78 and third stage 80 will be rotated about the axis second drive link 86 by the operation of drive mechanism 72. A mechanical stop 96 is provided to lock second stage 78 in a predetermined position in relation to first stage 76. Once stop 96 has been engaged, continued operation of drive mechanism 72 will function to fracture sheer pin 92, thereby allowing third drive link 88 to rotate in response to the rotation of second drive link 86. In this third mode of operation, third stage 80 will rotate about the axis of third drive link 88 as a result of the operation of drive mechanism 72. It can be appreciated that further stages can be driven by a single drive mechanism in a manner similar to the operation of the three stages of FIG. 3.

The embodiments described herein are provided for the purposes of illustration but not limitation, and the full scope of the applicants invention is as claimed below.

I claim as my invention:

1. An airborne vehicle comprising:
   a frame;
   a drive mechanism connected to the frame;
   a first drive link connected to the drive mechanism;
   a second drive link connected to the first drive link;
   a base;
   a control surface connected to the second drive link and to the base;
   a means for preventing relative movement between the first and the second drive links so that forward movement of the first drive link will move the base from a storage position to an extended position relative to the frame;
   a stop operable when engaged to prevent movement of the base relative to the frame once the base reaches the extended position;
   wherein operation of the drive mechanism with the stop engaged will release the means for preventing relative movement between the first and the second drive links so that movement of the drive mechanism will cause movement of the control surface relative to the frame.

2. The vehicle of claim 1 wherein the means for preventing relative movement between the first and the second drive links comprises a shear pin.

3. The vehicle of claim 1 wherein the means for preventing relative movement between the first and the second drive links comprises a clutch mechanism.

4. The vehicle of claim 1 wherein the means for preventing relative movement between the first and the second drive links comprises a ball detent mechanism.

5. The vehicle of claim 1 wherein the means for preventing relative movement between the first and the second drive links comprises an actuator.

6. The vehicle of claim 1 wherein the stop comprises a spring loaded pin and detent mechanism.

7. The vehicle of claim 1 wherein the stop comprises an actuator.

8. The vehicle of claim 1 wherein the drive mechanism comprises a servo motor.

9. The vehicle of claim 1 wherein the base further comprises an airfoil.

10. The vehicle of claim 1 further comprising a means for preventing relative movement between the control surface and the frame during a launching of the vehicle.

11. The vehicle of claim 10 wherein the means for preventing relative movement between the control surface and the frame comprises a shear pin, and wherein the shear pin is operable to be fractured by operation of the drive mechanism.

12. The vehicle of claim 10 wherein the means for preventing relative movement between the control surface and the frame comprises an actuator.

13. An airborne vehicle comprising:

a frame;

a servo mechanism attached to the frame;

a first drive shaft connected to the servo mechanism and rotatably supported by the frame;

a second drive shaft connected to the first drive shaft by a gear mechanism;

an elevon attached to the second drive shaft;

a wing base rotatably attached to the first drive shaft and the elevon;

a means for preventing relative movement between the first and the second drive shafts so that forward rotation of the first drive shaft will rotate the wing base from a storage position to an extended position relative to the frame;

a stop operable when engaged to prevent rotation of the wing base relative to the frame once the wing base reaches the extended position;

wherein operation of the servo mechanism with the stop engaged will release the means for preventing relative movement between the first and the second drive shafts so that rotation of the servo mechanism will cause rotation of the elevon relative to the wing base.

14. The vehicle of claim 13 wherein the wing base further comprises an airfoil.

15. The vehicle of claim 13 wherein the means for preventing relative movement between the first and the second drive shafts comprises a shear pin.

16. The vehicle of claim 13 wherein the means for preventing relative movement between the first and the second drive shafts comprises a clutch mechanism.

17. The vehicle of claim 13 wherein the means for preventing relative movement between the first and the second drive shafts comprises a ball detent mechanism.

18. The vehicle of claim 13 wherein the means for preventing relative movement between the first and the second drive shafts comprises an actuator.

* * * * *